(12) United States Patent
Schwarz et al.

(10) Patent No.: US 7,909,730 B2
(45) Date of Patent: Mar. 22, 2011

(54) METHOD FOR VEHICLE CREEP TORQUE CONTROL

(75) Inventors: Jonathan R. Schwarz, Clawson, MI (US); Kevin S. Kidston, New Hudson, MI (US); Jon K. Logan, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 655 days.

(21) Appl. No.: 11/934,322

(22) Filed: Nov. 2, 2007

(65) Prior Publication Data

US 2009/0114468 A1   May 7, 2009

(51) Int. Cl.
*B60W 10/18* (2006.01)
(52) U.S. Cl. ......................................................... 477/93
(58) Field of Classification Search ....................... 477/93
See application file for complete search history.

(56) References Cited

U.S. PATENT DOCUMENTS

| 4,828,334 | A | * | 5/1989 | Salman | 303/191 |
| 5,457,363 | A | * | 10/1995 | Yoshii et al. | 318/432 |
| 6,089,677 | A | * | 7/2000 | Fukumura et al. | 303/112 |
| 6,158,822 | A | * | 12/2000 | Shirai et al. | 303/3 |
| 7,165,819 | B2 | * | 1/2007 | Yokoyama | 303/151 |
| 2004/0204285 | A1 | | 10/2004 | Ueno | |
| 2007/0191181 | A1 | * | 8/2007 | Burns | 477/40 |
| 2010/0004809 | A1 | * | 1/2010 | Itoh | 701/22 |

FOREIGN PATENT DOCUMENTS

| DE | 10221835 A1 | | 12/2003 |
| JP | 2000009157 A | | 1/2000 |
| JP | 2005045864 A | * | 2/2005 |

* cited by examiner

*Primary Examiner* — Ha D. Ho

(57) ABSTRACT

A vehicle and a method of operation. The method of operating the vehicle may include a method of controlling a creep torque in a vehicle having a powertrain configured to provide variable creep torque. The method may comprise the steps of: detecting a vehicle creep torque condition, determining a brake torque, and adjusting a creep torque applied by the powertrain based on the brake torque.

10 Claims, 2 Drawing Sheets

METHOD FOR VEHICLE CREEP TORQUE CONTROL

BACKGROUND OF INVENTION

The present invention relates generally to a method for controlling creep torque in a vehicle.

Automotive vehicles typically have a vehicle technical specification that defines how fast the particular vehicle should accelerate from a stop when it is idling in gear and the driver applies no pressure to the brake pedal or the accelerator pedal. To accomplish this, the powertrain system is designed to apply a specific amount of torque when the vehicle is stopped, called creep torque. This creep torque, then, acts against the brake application by the driver while the vehicle is stopped. Upon release of the brake pedal, the vehicle will begin to move, even without pressing on the accelerator pedal. In a vehicle with a conventional internal combustion engine, automatic transmission and torque converter, applying a creep torque is relatively easy since the engine is operating all of the time—even while the vehicle is stopped at a traffic light.

For some newer types of vehicles where an engine is not operating all of the time, applying creep torque is more of a challenge. Such vehicles may be, for example, two-mode hybrid vehicles, battery electric vehicles, and fuel cell vehicles. For these types of vehicles, when the vehicle is stopped (while in gear) the electric motor is typically operated to supply a creep torque similar to conventional vehicles. In this way, drivers switching between driving conventional vehicles and these newer types of vehicles will get the same sensation when releasing the brake to start-up from a stop. However, the extra energy used by the motor to maintain the creep torque while the vehicle is stopped while in gear somewhat defeats the purpose of implementing these non-conventional powertrains in the new types of vehicles.

SUMMARY OF INVENTION

An embodiment contemplates a method of controlling a creep torque in a vehicle having a powertrain configured to provide variable creep torque, the method comprising the steps of: detecting a vehicle creep torque condition, determining an initial brake torque, and adjusting a creep torque applied by the powertrain based on the initial brake torque.

An embodiment contemplates a method of controlling a creep torque in a vehicle having a powertrain configured to provide variable creep torque, the method comprising the steps of: detecting a vehicle creep torque condition, determining a brake torque, determining a new brake torque, calculating a rate of change of brake torque based on the brake torque and the new brake torque, and adjusting a creep torque applied by the powertrain based on the new brake torque and the rate of change of brake torque.

An embodiment contemplates a vehicle including a brake system and a powertrain system. The brake system includes a plurality of brakes, a brake controller configured to determine an amount of brake torque to apply to the plurality of brakes, a user operable brake pedal, and a brake position sensor configured to detect a position of the brake pedal. The powertrain system is configured to provide variable creep torque and includes a powertrain controller configured to adjust a creep torque based on the amount of brake torque indicated by the brake controller.

An advantage of an embodiment is reduced energy usage since the energy needed for creep torque is minimized while the vehicle is stationary, but the desired creep torque feel is still provided to the driver when needed during vehicle start-up. Moreover, the creep torque feel may even be improved somewhat since, while stopped in a creep torque situation, the brakes are not unnecessarily working against a creep torque produced by the vehicle.

DETAILED DESCRIPTION

Figure 1:
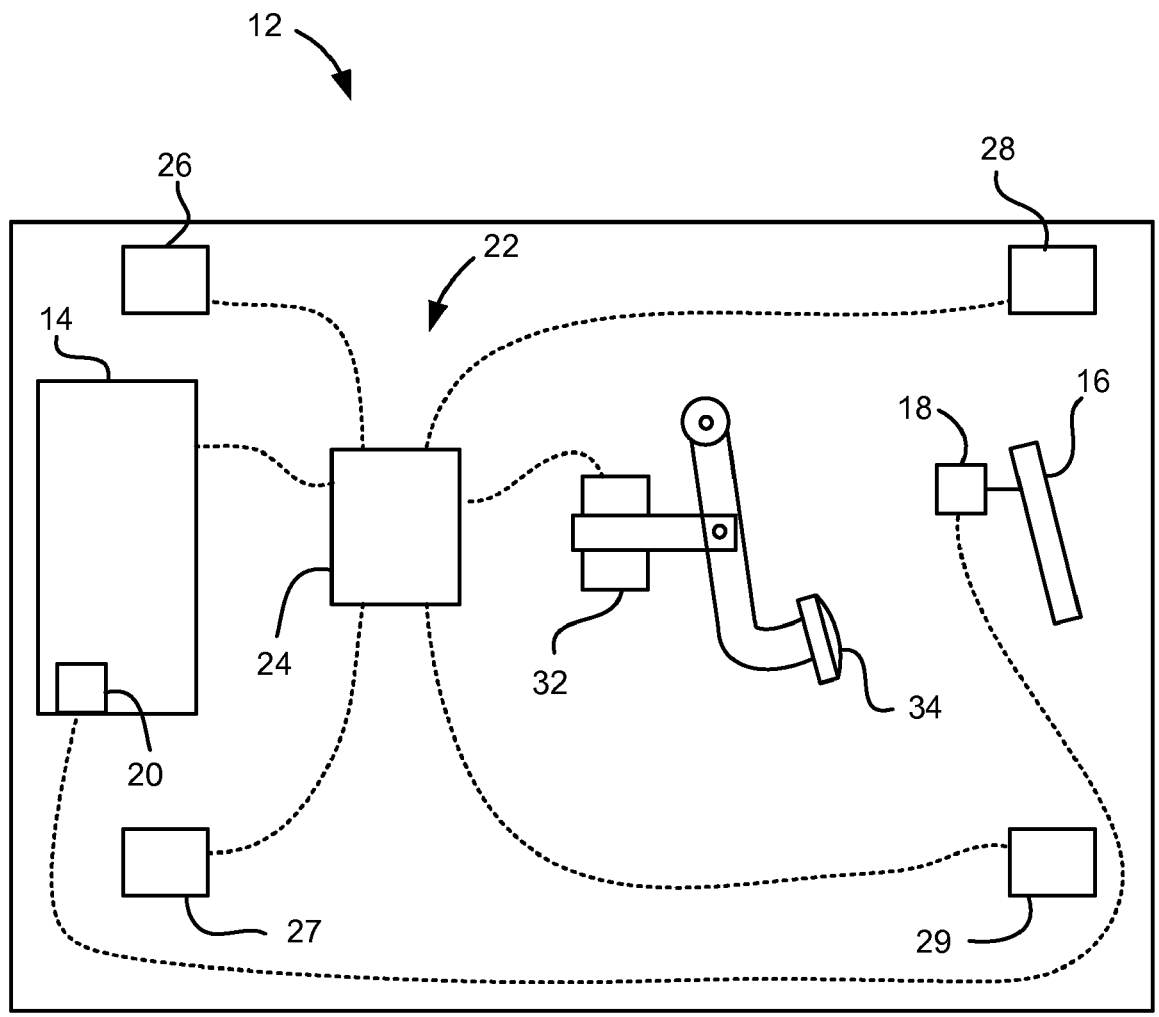
FIG. 1 is a schematic view of a vehicle to which a method for controlling a creep torque may be employed.

Referring to FIG. 1, a vehicle, indicated generally at 12, is shown. The vehicle 12 includes a powertrain system 14 having variable creep torque capability, such as, for example, two-mode hybrid, battery electric, and fuel cell vehicles. A driver operated accelerator pedal 16 may include a position sensor 18 that communicates the pedal position to a powertrain controller 20.

The vehicle also includes a brake system 22 having a brake controller 24 that controls the braking pressure applied by a right-front wheel brake 26, a left-front wheel brake 27, a right-rear wheel brake 28 and a left-rear wheel brake 29. A brake position sensor 32 detects the position of a driver operated brake pedal 34 and communicates the position to the brake controller 24. The brake controller 24 may be separate from or a portion of another controller and may be any desired combination of hardware or software as is known to those skilled in the art. The brake pressure may be applied to the brakes 26-29 via a hydraulic, pneumatic or electric subsystem, as desired for the particular vehicle.

Figure 2:
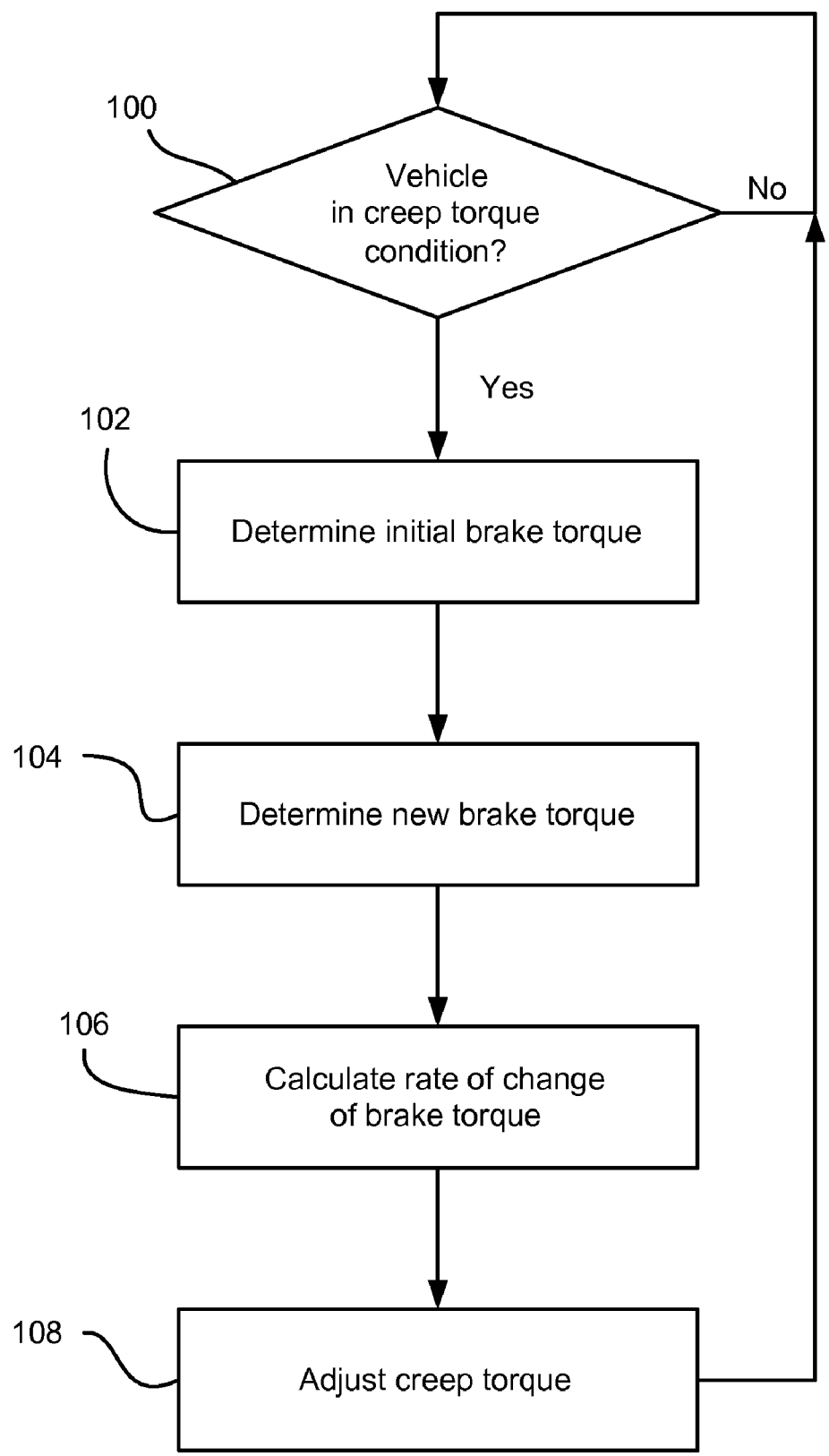
FIG. 2 is a flow chart disclosing a method for controlling a creep torque in a vehicle.

FIG. 2 is a flow chart showing a method for controlling creep torque in the vehicle of FIG. 1. A determination is made whether the vehicle is in a creep torque condition, block 100. A determination that the vehicle 12 is in a creep torque condition may be based on, for example, the vehicle 12 being in a driving gear, moving at a slow or no speed, and the driver applying little or no force on the accelerator pedal 16. Of course, other factors or combinations of factors may be employed to determine that the vehicle 12 is in a creep torque condition.

If the vehicle 12 is determined to be in a creep torque condition, then an initial brake torque is determined, block 102. The initial brake torque may be determined by the brake controller 24 based on input from the brake position sensor 32. The brake position sensor 32, of course, reflects the force applied to the brake pedal 34 by the driver. A new brake torque is determined, block 104. A new brake torque may be determined, for example, every fifty milliseconds (or at some other preferred time interval). The rate of change of the brake torque is calculated, block 106. The rate of change of the brake torque may be determined by comparing the new brake torque with the initial brake torque (i.e., the immediately prior determined brake torque). Of course, after the next time interval when another new brake toque is determined, it would then be compared to the previous new brake torque (which would then become the initial brake torque). The rate of change may also be calculated over multiple consecutive time intervals instead, if so desired.

The amount of creep torque applied by the powertrain system 14 is adjusted, block 108. The adjustment is based on the new brake torque and the rate of change of brake torque. A simplified version of a possible equation that may be employed is that the creep torque=an initial creep torque−(the new brake torque)/(rate of change of brake torque), with the rate of change being the initial brake torque minus the new brake torque. Alternatively, a look-up table based on these variables may be employed. And, of course, the creep torque can be overridden when accelerator pedal or other torque request is received by the powertrain controller.

This creep torque process, then, provides the creep torque desired by the driver when needed, without unnecessarily providing a creep torque when not needed. In general, the higher the brake force applied to the brake pedal 34, the less creep torque is applied. For example, when the driver is pressing on the brake pedal 34 and maintaining this force sufficient to indicate a desire to stop or stay stopped, the creep torque will be reduced to zero, thus reducing the energy used by the powertrain system 14. As the driver starts to release the brake pedal 34, the amount of creep torque is ramped-up by the powertrain system 14 in a way that creates essentially the same feel for the driver as the creep torque generated by a conventional vehicle. And, by looking at the rate of change of the brake torque, this allows for greater creep torque to be applied when the brake pedal is released more quickly, which may even improve the feel of creep torque to the driver over that of a conventional vehicle.

While certain embodiments of the present invention have been described in detail, those familiar with the art to which this invention relates will recognize various alternative designs and embodiments for practicing the invention as defined by the following claims.

What is claimed is:

1. A method of controlling a creep torque in a vehicle having a powertrain configured to provide variable creep torque, the method comprising the steps of:
   (a) detecting a vehicle creep torque condition;
   (b) determining a brake torque; and
   (c) adjusting a creep torque applied by the powertrain based on the brake torque, wherein the applied creep torque is adjusted to zero when the brake torque is greater than a predetermined amount of brake torque.

2. The method of claim 1 including (d) determining a new brake torque after step (b), and (e) calculating a rate of change of brake torque based on the brake torque and the new brake torque, and wherein step (c) is further defined by the adjustment in the creep torque being based on the rate of change of brake torque.

3. The method of claim 2 wherein step (c) is further defined by a greater creep torque being applied when the rate of change of brake torque in a direction of reduced brake torque is greater, and a relatively lower creep torque is applied when the rate of change of brake torque in the direction of reduced brake torque is relatively lower.

4. The method of claim 1 wherein step (b) is further defined by determining the brake torque based on input from a brake position sensor that detects a position of a brake pedal.

5. A method of controlling a creep torque in a vehicle having a powertrain configured to provide variable creep torque, the method comprising the steps of:
   (a) detecting a vehicle creep torque condition;
   (b) determining a brake torque;
   (c) determining a new brake torque;
   (d) calculating a rate of change of brake torque based on the brake torque and the new brake torque; and
   (e) adjusting a creep torque applied by the powertrain based on the new brake torque and the rate of change of brake torque.

6. The method of claim 5 wherein step (e) is further defined by a greater creep torque being applied when the rate of change of brake torque in a direction of reduced brake torque is greater, and a relatively lower creep torque is applied when the rate of change of brake torque in the direction of reduced brake torque is relatively lower.

7. The method of claim 5 wherein step (e) is further defined by the applied creep torque being adjusted to zero when the brake torque is greater than a predetermined amount of brake torque.

8. The method of claim 5 wherein step (b) is further defined by determining the brake torque based on input from a brake position sensor that detects a position of a brake pedal.

9. A method of controlling a creep torque in a vehicle having a powertrain configured to provide variable creep torque, the method comprising the steps of:
   (a) detecting a vehicle creep torque condition;
   (b) determining a brake torque based on input from a brake position sensor that detects a position of a brake pedal; and
   (c) adjusting a creep torque applied by the powertrain based on the brake torque.

10. The method of claim 9 including (d) determining a new brake torque after step (b), and (e) calculating a rate of change of brake torque based on the brake torque and the new brake torque, and wherein step (c) is further defined by the adjustment in the creep torque being based on the rate of change of brake torque, and a greater creep torque being applied when the rate of change of brake torque in a direction of reduced brake torque is greater, and a relatively lower creep torque is applied when the rate of change of brake torque in the direction of reduced brake torque is relatively lower.

* * * * *